Dec. 29, 1936.  L. M. ROSSI ET AL  2,066,016
METHOD AND DEVICE FOR TESTING HEAT SENSITIVE PLASTICS
Filed Feb. 3, 1934  2 Sheets-Sheet 1
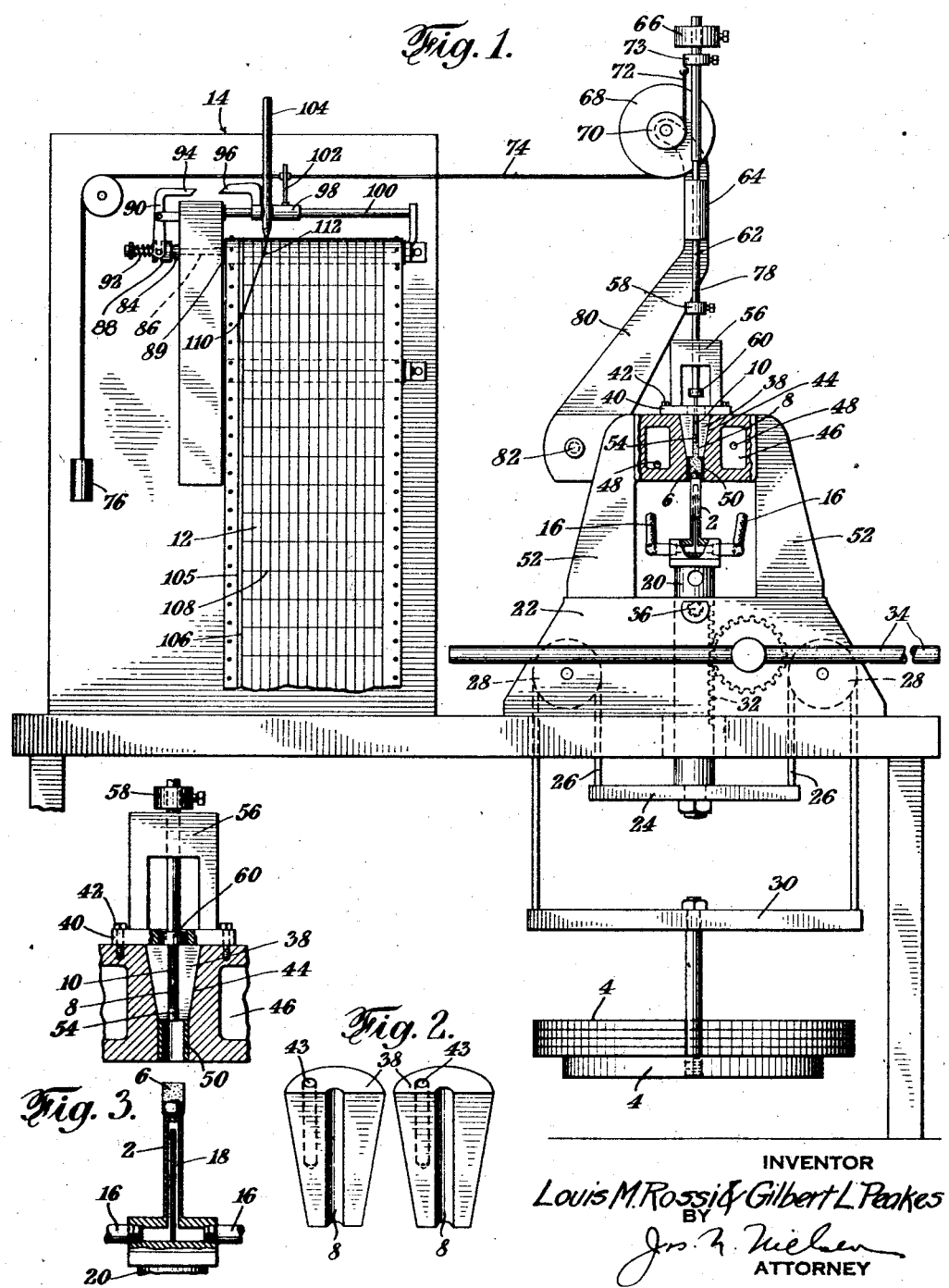
INVENTOR
Louis M. Rossi & Gilbert L. Peakes
BY
ATTORNEY Dec. 29, 1936.   L. M. ROSSI ET AL   2,066,016
METHOD AND DEVICE FOR TESTING HEAT SENSITIVE PLASTICS
Filed Feb. 3, 1934   2 Sheets-Sheet 2

INVENTOR.
Louis M. Rossi & Gilbert L. Peakes
BY
Jos. N. Nielsen
ATTORNEY.

Patented Dec. 29, 1936

2,066,016

UNITED STATES PATENT OFFICE 2,066,016

METHOD AND DEVICE FOR TESTING HEAT SENSITIVE PLASTICS

Louis M. Rossi, Perth Amboy, and Gilbert L. Peakes, Metuchen, N. J., assignors to Bakelite Corporation, New York, N. Y., a corporation of Delaware Application February 3, 1934, Serial No. 709,638
In Great Britain January 31, 1934

18 Claims.  (Cl. 265—11)

This invention relates to a method and device for testing heat hardenable resins and various compositions containing them.

At the present time there are in general use, many different types of heat hardenable plastic materials, for instance, the phenol formaldehyde resins, the urea formaldehyde resins, etc. which are molded into various useful articles, for instance, the familiar cups, pipes, electrical plugs, handles for coffee pots, bottle caps, etc. The production of these finished articles is usually divided into two stages; the first being the manufacture of the resinous material by manufacturers who do no molding, and the second being by the molders who purchase the resinous materials from the producers and subject this material to a forming or molding process which results in the finished articles as they are sold in the retail stores or as incorporated in other devices. The molding of the resin-containing material to produce the finished article is usually done under heat and pressure. As there are many molding compositions each of which has distinct molding characteristics, it behooves both the resin producer and the molder to know the characteristics of the materials which they produce or use, that is, the correct temperature to which the molds are to be be heated in order to obtain the hardening, the temperature above which the molds cannot be heated without causing a defective molded piece, the ability of the resin-containing material to flow to reproduce the details of the mold, the pressure which must be used to force the resin-containing material to fill the parts of the mold, and the time which the mass requires to harden, as well as many other correlated characteristics which must be considered in manufacturing the many different resinous materials and transforming them into molded articles.

The object of the present invention is a device and method by which resin-containing materials can easily and quickly be tested to determine their characteristics in order that the resin manufacturer may recommend the time, temperature, pressure, etc. to be used in molding his product and the molder can easily check whether or not the material meets his specifications and also check the changes in the material due to aging, etc.

In the drawings:

Fig. 1 shows the testing machine.

Fig. 2 shows the mold block.

Fig. 3 shows the top of the ram with associated parts and a test piece.

Figure 4:
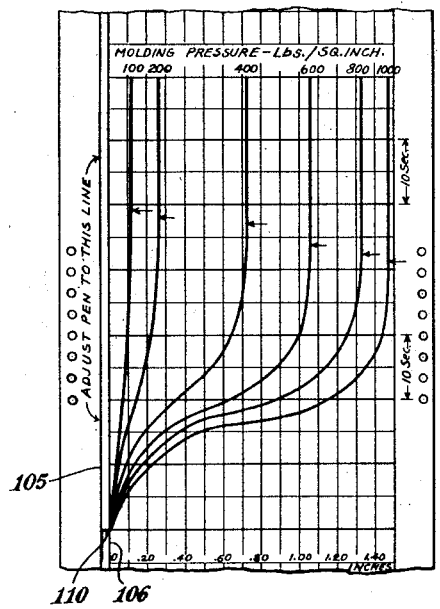
Figs. 4, 5, 6 and 7 show characteristic charts and graphs.

In general, the machine comprises a heated constant-temperature ram or force 2 upon which a constant pressure is applied by the weights 4 to force a test piece 6 of resin-containing material into a bore 8 of uniform diameter and constant temperature, against a counter-weighted plunger 10, the movement of which is recorded on a chart 12 by a recording mechanism 14. As will later be described, the increments of time taken by the resin-containing material of the test piece to soften and flow various distances into the bore 8 together with the distance of flow before it hardens and ceases to flow, as recorded on the chart, together with the temperature of the mold and the pressure exerted on the force 2 by the weight 4 taken in conjunction with the surface condition of the test piece when it is removed from the testing apparatus, give data for determining the characteristics of the resinous material and give a good indication of what may be expected from the material in commercial use.

The force or ram 2 is heated in any suitable manner, preferably by steam connections 16, as this type of heat is available in substantially every molding plant and a constant temperature may easily be obtained by regulation of the steam pressure. In order to insure uniform heating of the ram, a fin 18 or other suitable dividing means is provided to force the steam to circulate into that end of the ram which contacts with the test piece 6. The ram is mounted upon a movable support 20 guided in a base 22 and mounted on a cross bar 24 so as to be directly in line with the bore or cylinder 8. The cross bar 24 is moved through flexible connections 26 fastened to the ends thereof equidistant from the center so as to cause no side binding of any part of the apparatus. Chains are suitable for these flexible connections 26. The chains pass over pulleys 28 which operate with a minimum friction, and are connected to a lower cross bar 30 from the center of which the weights 4 are suspended. Weights are used to supply molding pressure in preference to other pressure means, as it is desirable to have a constant unvarying pressure on the test piece, which will be easily, quickly, and reproducibly adjustable and accurately known. The original adjustment of the lowermost weight 4 provides for (1), balancing the weight of part 30 and its associated rod and chains against the weight of parts 2, 16, 20 and 24; (2), overcoming the static friction of moving parts such as 20, 28, and the pinion of rack 32; (3), counterbalancing on the area of ram 2 the pressure produced at the bottom of plunger 10 by the weight and friction of the recording mechanism, and (4), providing the first step of net flowing pressure, for instance 100 lbs. per square inch. However, other pressure means are not excluded.

A rack 32 on the side of the support 20 and its associated pinion operated by a balanced handle bar 34 may be used to control the application of the molding pressure and enable the ram 2 to be retracted for the application or removal of test pieces. A pin 36 passing through the base 22 into suitably placed holes in the support 20 enables the ram 2 to be held in retracted position against the force of the weights 4.

The bore 8 of uniform diameter, is formed within a metallic mold block 38 which is preferably of steel with the interior polished or otherwise finished to duplicate the surfaces of the molds in which the material under test is to be molded in the molding plant. However, the surface of the bore may be scored, sand blasted or otherwise roughened to prevent slippage of the test material along the surface of the bore. In order to facilitate inspection of the surface of the bore from time to time, the block 38 may be in sections and preferably has the external form of a cone so that it may be driven tightly in place and held in position by the strap 40 and fastening means, for instance bolts 42. An opening 43 permits a thermometer, thermocouple or other temperature indicating or recording instrument to be inserted to determine the exact temperature of the cone. The block 38 is received within a seat 44 maintained at constant temperature in any suitable manner, but preferably by steam of the required pressure to give the desired temperature, which circulates within the passages 46 by means of the entrance and exit connections 48. An easily renewed bushing 50 which may be of the same material as the mold block 38, provides a close but running fit with the top of the ram 2 and provides a chamber to receive the test piece. The parts just described are firmly supported with the bore 8 directly over the ram 2, by means of heavy frames 52.

The counter weighted plunger 10 is provided with a tip 54 having a close but running fit in the bore 8 forming a yieldable wall portion for the chamber 50 and a plug for the bore closing the chamber. Stainless steel, hardened tool steel or chromium plated metal may successfully be used for this tip as well as the mold block 38 and bushing 50. The plunger 10 passes through a guide yoke 56 and may conveniently be provided with a collar 58 and shoulder 60 positioned so that when the shoulder 60 rests against one end of the bore 8, the tip 54 projects slightly from the other end of the bore 8 for reasons later set forth. The shoulder 60 is also preferably so positioned with relation to the under surface of the yoke 56 that it prevents the plunger from being pushed entirely out of the bore 8. The collar 58 may adjustably be positioned along the plunger. It serves to prevent the plunger falling out of the yoke when the parts are separated for cleaning. It may also be positioned to contact with the top of the yoke 56 to hold the plunger in various positions in the bore 8. Furthermore it may be positioned below the yoke to limit the amount of upward movement of the plunger 10 as well as to hold the plunger at the bottom of the bore and prevent any movement so that the test piece can be molded in the bushing 50 with heat and pressure but without flow into the bore 8. This section of the plunger preferably has a minimum weight consistent with strength so that the resin-containing material may flow against little or substantially no pressure if desired. The section 62 of the plunger moves through an elongated guide 64 and may be provided with a weight 66 to give the desired counter pressure which may be adjusted as desired. Counter pressure may also be applied through the pulleys 68 and 70 which are fastened together and to the ends of connectors, preferably nonstretchable and flexible as shown, one pulley being connected by a flexible chain 72 and adjustable collar 73 to the plunger and the other pulley 68 being connected by the chain 74 to the recording mechanism and weight 76. Various amounts of counter pressure can thus be obtained to compress the test material within the bore 8 during flow to provide a dynamic compression. The two sections of the plunger contact at 78 but are preferably unconnected and the support 80 and its associated parts may be tilted to the left of Fig. 1 when not wanted. This provides means for easily disconnecting the recording mechanism from the other parts of the device. When the permanent recording mechanism is not used, the weight 66 or a weight equivalent to the counter pressure desired for the test, may be placed on the top of the lower section 10 of the plunger.

The recording mechanism includes a rotating member 84 which is preferably driven at a constant speed by any suitable mechanism for instance, a clock or constant speed motor. The member 84 freely rotates on shaft 86 but can be connected to the shaft 86 through the clutch 88 which is splined to the shaft. In the preferred mechanism, the shaft 86 moves the chart drum 89 and the chart 12 at a uniform rate of speed when the clutch is connected. The clutch arm 90 operates against the force of spring 92 so that when the end 94 of the clutch arm 90 is depressed under the end 96 of the trigger arm, the parts of the clutch are dissociated permitting the rotating member 84 to revolve freely and the chart to remain stationary. The arm 96 is connected with the pen slide 98 which moves along guide 100 in accordance with the movement of the chain 74 which is connected to the pen slide by the adjustable connection 102. A pen or other marking implement 104 contacts with the chart. Other clutch and driving mechanism may be used with the preferred end in view that the chart moves at a constant and uniform speed and may be started or stopped as easily and quickly as possible with a minimum lag due to inertia of the chart or its driving mechanism.

An operable embodiment of the device will now be described by way of example, it being understood that all numerical references are merely for illustration and may be changed without departing from the invention. The several parts of the device may be correlated and calibrated to operate as desired. The bore 8 is preferably small, for instance $\frac{1}{8}''$ in diameter and approximately $1\frac{1}{2}''$ long. The chamber within the bushing 50 which is concentric with the bore is several times the diameter of the bore, for example $\frac{3}{8}''$ inside diameter and the length of the chamber is sufficient to hold enough test material to fill the bore and leave a fairly thick wafer in the chamber; for instance, the chamber may be $\frac{3}{4}''$ long. The pulleys 68 and 70 have such a ratio that the chains 74 and 72 have any desired ratio of movement "X" for instance 3 to 1 and the paper on the chart 12 is preferably ruled to correspond with the actual flow distance in the tube 8 as multiplied by the relative movement of the chains, for instance the paper may be ruled 4½" wide. The chart is moved at any desired rate, for instance 6" per minute. The positions of the chains 72 and 74 and the point at which the connection 102 is made between the chain 74 and the pen slide 98 and the position of the collar 72 are all so adjusted that there is no slack in the chains and when the plunger 10 is in its lowest position, the pen stands on the recording chart at the line 108 which is "Y" distance, for example .09", to the left of the zero line 106 at which the record usually begins. The end 84 of the clutch arm and the end 96 of the trigger arm are so positioned that when engaged, with the pen on line 108, a movement of the pen of "Y" distance or .09" will disengage them, thus permitting the clutch to close and instantly start the chart at the exact moment the pen comes up to the zero line 106.

To set the mechanism for beginning the test, the temperatures are adjusted and the required number of weights 4 are applied to give the required test conditions. The ram or force 2 is withdrawn from the bushing 50 by means of the rack and pinion 32, being held in retracted position by the pin 36. The clutch 64 is engaged and allowed to drive the chart until the pen rests on one of the lines 108 denoting the time divisions. At this moment the end 84 of the clutch arm is depressed and engaged under the end 96 of the trigger arm thereby stopping the chart. The tablet 6 of test material is placed on top of the ram 2, the pin 36 is withdrawn and the weights 4 are allowed to raise the tablet against the tip 54 of the plunger 10 which projects $$\frac{Y}{X}$$

or in this example .03" below the bottom of the bore 8, this amount of projection being obtained by the position of the collar 60 on the plunger 10 so that when the collar 60 rests on the top of the bore 8 the bottom of the tip 54 projects .03" below the bottom of the bore. The tablet of test material raises the tip 54 of the plunger 10 flush with the bottom of the bore 8 the instant pressure is applied and before any flow takes place; this movement acting through pulleys 68 and 70 moves the end 96 of the trigger arm out of contact with the end 94 of the clutch arm which, in turn causes the parts of the clutch 84 to engage and starts the chart. The motion of .09" of the pen slide moves the marker over to the zero line 106 giving the mark 110 as is indicated on the chart. Thus, at the moment when the bottom of the tip 54 of the plunger 10 is flush with the bottom of the bore 8, pressure comes on the test material, the chart begins to move and the pen 104 may move across the chart at right angles to the chart motion as soon as the material under test begins to flow up into the bore 8, giving the graph 112. The speed of the pen across the chart is governed by the speed at which the test material flows into the bore 8. When the material in the bore hardens and stops flowing, the movement of the pen across the chart ceases and the line made by the pen will then extend parallel to the longitudinal axis of the chart.

Figure 6:
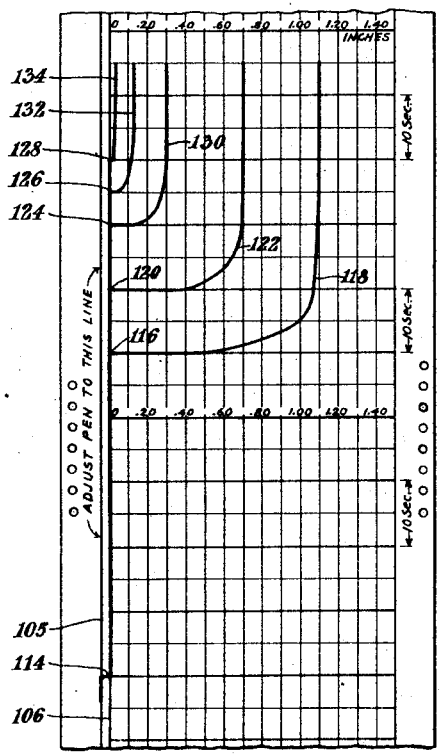

The charts, for instance those shown in Figs. 4 and 6, then give automatically produced and accurate records of the total distance of flow at every instant and increments of flow distance with relation to increments of time under such heat and dynamic compression as are desired for the tests. From these charts, it is possible to determine for heat sensitive chemically reactive and hardenable materials, the time required before flow begins, the speed of flow at any instant, the time when the material begins to set, the time of setting, and any desired combination, total, or derivative of these measurements. For example, the direct curve drawn by the device gives a curve of total distance of flow against time; at suitably chosen points of this curve, the speed may be calculated and then plotted to give a curve of speed against time.

In Fig. 4 is shown a series of graphs made by the previously described machine, using different weights 4 to give the pressures denoted on the figure in net pounds per square inch; as an example, if the weight on the plunger represents a pressure of 40 pounds per square inch, the weights 4 are adjusted to give a pressure of 1040 pounds per square inch on the material, leaving a net flowing pressure of 1000 pounds per square inch. We prefer to express pressures as net pressures although we can use the figure for total molding pressure. In making the curves shown on Fig. 4, the weights 4 are adjusted to give a net pressure of 1000 pounds per square inch on the test material and the graph marked 1000 is made. The paper is then rolled back to the starting point, the mold emptied and cleaned, the weights 4 are adjusted to give a net pressure of 800 pounds per square inch on the test material, another tablet of the same material is inserted, and the test is repeated producing the graph marked 800. The other graphs are made in a similar manner. The points indicated by the arrows show where the material hardened sufficiently to stop flowing.

In order to permit testing under higher pressures it is possible to use a bore longer than 1½ inches so that the material may flow a greater distance without extruding from the end of the bore. It is also possible to use a bore which is artificially roughened, a bore of smaller diameter, a larger ratio of ram area to bore area, a thicker tablet, a higher temperature, or a restricted opening from the chamber into the bore 8. By suitable changes in one or more of the variables, substantial increases in the pressure required to give a certain distance of flow, may be obtained. In such cases, the ratio of pulleys 68 and 70 may or may not be changed as desired.

Figure 5:
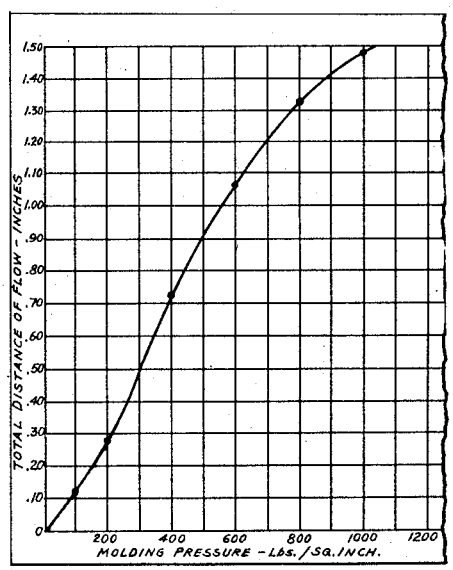

Fig. 5 is a distance-pressure curve showing the total distance of flow in inches plotted against the net flowing pressure for the sample used in Fig. 4. To prepare Fig. 5, the distances from the zero line, that is line 106, to the non-flow points denoted by the arrows on Fig. 4 are plotted vertically, the pressures are plotted horizontally and a smooth curve drawn through the points plotted. This graph shows the total amount of flow obtainable from the material as the pressures increase.

Fig. 6 represents a series of graphs obtained by holding the plunger 10 in such a position that the bottom of the tip 54 is flush with the bottom of the bore 8, that is, the test piece is held under predetermined heat and pressure within the bushing 50, for predetermined periods of time before the plunger is permitted to rise. These graphs show the amount of plasticity remaining in the material after heating at the predetermined temperature under the predetermined pressure for the times chosen. The material under test is held at a chosen pressure, for instance 1000 pounds per square inch net, obtained by the weights 4 and at a chosen temperature, for instance 150° C. The point 114 indicates the time when the pressure is applied to the material. The plunger 10 is held down until the point 116 chosen according to the material and temperature, is reached when the plunger is suddenly released and the pen gives a curve 118. The machine is cleaned and the chart is reset at the point 114. Another test is made using another test tablet of the same material but the plunger 10 is held for 10 seconds more than in the first test or until the point 120 is reached, whereupon the plunger is released and the curve 122 is obtained. This test is again repeated using the same temperature and pressure but longer times giving the points 124, 126 and 128 with the corresponding curves 130, 132 and 134. The chart shows that the material has substantially zero flow at the point 128 and so far as commercial molding is concerned has no practical flow at the point 126; in other words, that in commercial molding under comparable temperature and flow conditions, all necessary flow of the material in the mold particularly the filling of small lines and cavities, for instance the fine lines of a delicate design, should be completed before 75 seconds have elapsed.

Figure 7:
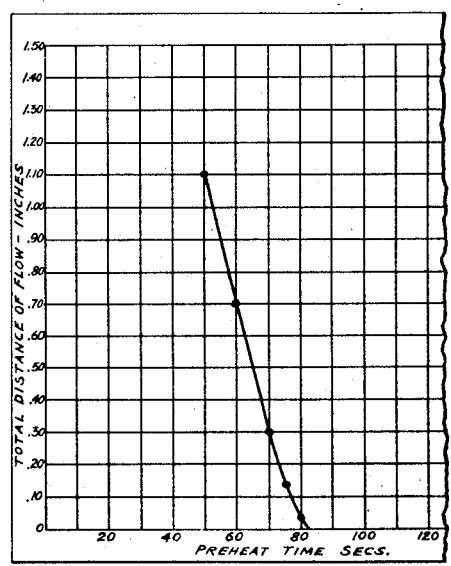

By plotting as shown on Fig. 7, the total distances of flow so obtained against the times of preheating, the time necessary to reduce flow or plasticity to zero under the chosen condition may be extrapolated. Such curves showing the rate of setting, may be used to compare different materials under a given set of conditions.

By making another series of such tests at different temperatures, the molder may know the extent to which changes in temperature affect the setting rate of the material. As the reaction proceeds more rapidly at higher temperatures, the hardening is completed sooner which would indicate to the molder that at higher temperatures even less time is available for the material tested within which a commercial molded piece may be filled out.

From the previous description of the testing device and method of operation, it will be obvious that many modifications of the device and method may be made, and that tests may be applied on many different kinds of rheologic materials that is materials having rheologic properties or properties of deformation and flow; and it is therefore our desire that the invention be construed as broadly as the claims taken in conjunction with the prior art may allow.

We claim:

1. In a device for testing the hardening characteristics of a material having rheologic properties, a closable chamber for receiving the material to be tested, said chamber having a wall portion yieldable at the rate of flow of the material under test, means for holding the chamber at a constant temperature, means for applying a constant uniform pressure to the material within the chamber and forcing the said yieldable wall portion to move.

2. In a device for testing the hardening characteristics of a heat hardenable material having rheologic properties, a closable chamber for receiving the material to be tested, said chamber having a wall yieldable under pressure exerted by the material under test, means for applying a constant uniform pressure to the material within the chamber and forcing the said yieldable wall to move, and means for hardening the material during the test.

3. In a device for testing the hardening characteristics of a material having rheologic properties, a closable chamber for receiving the material to be tested, said chamber having a yieldable wall portion, means for applying pressure to the material within the chamber and forcing the said yieldable wall portion to move, and means for applying a constant uniform pressure against the yieldable wall portion resisting the first pressure.

4. In a device for testing the hardening characteristics of a material having rheologic properties, a closable chamber for receiving the material to be tested, said chamber having a wall portion yieldable at the rate of flow of the material under test, selective means for applying a series of different but constant uniform pressures to materials within the chamber and forcing the said yieldable wall portion to move, and means for applying different but constant uniform pressures against the yieldable wall portion resisting the first pressure.

5. In a device for testing the hardening characteristics of a material having rheologic properties, a closable chamber for receiving the material to be tested, said chamber having a yieldable wall portion, means for applying a constant uniform pressure to the material within the chamber and forcing the said yieldable wall portion to move by the material, and means for observing movement of said wall portion.

6. In a device for testing the hardening characteristics of a material having rheologic properties, a closable chamber for receiving the material to be tested, said chamber having a yieldable wall portion, means for applying pressure to the material within the chamber and forcing the said yieldable wall portion to move, and means for recording movement of said wall portion in relation to time.

7. In a device for testing the hardening characteristics of a material having rheologic properties, a closable chamber for receiving the material to be tested, a bore connecting with the chamber, a yieldable plug within the bore, means for applying pressure to the material within the chamber and forcing the said plug to move, said bore being smaller in cross section than the chamber whereby deformation of the material and resistance to the flow from the chamber occurs during the hardening test.

8. In a device for testing the hardening characteristics of a material having rheologic properties, a closable chamber for receiving the material to be tested, said chamber having a yieldable wall portion, means for applying constant uniform pressure to the material within the chamber and forcing the said yieldable wall portion to move, and means for applying a steady pressure against the yieldable wall portion resisting the first pressure.

9. In a device for testing the hardening characteristics of a material having rheologic properties, a closable chamber for receiving the material to be tested, said chamber having a wall yieldable by the flow of the material under test and adaptable for connection to an indicating device to measure that flow under uniform pressure, means for closing the chamber by pressure and forcing the material to move said yieldable wall.

10. In a device for testing the hardening characteristics of a chemically reactive material having rheologic properties, a closable chamber for receiving the material to be tested, said chamber having a wall portion yieldable under pressure exerted by the material under test and adaptable for connection to an indicating device to measure the flow of the material under uniform pressure, means for applying pressure to the material within the chamber and forcing said yieldable wall to move and means for causing the chemical reaction to take place during the test.

11. In a device of the kind described, an extrusion chamber including an extrusion bore, means for applying a constant measured pressure upon the contents of said chamber to extrude the same, means for maintaining said extrusion chamber at a selected temperature, and means reacting under predetermined resistance upon the extruded material in said bore to compress same.

12. A method of determining the hardening properties of rheologic materials of the type which harden under temperature change and pressure, first becoming fluent and then hardening, comprising confining a body of the material in a chamber having an extrusion outlet, simultaneously applying a predetermined temperature and pressure to the confined material thereby forcing the material while in its fluent state to exude from said outlet against a predetermined counter pressure until prevented by the hardening of the material and measuring the quantity of material exuded under such conditions as an index of the hardening properties of the material.

13. A method of determining the hardening properties of rheologic materials of the type which harden under temperature change and pressure, first becoming fluent and then hardening, comprising confining a body of the material in a chamber having an extrusion outlet, simultaneously applying a predetermined temperature and pressure to the confined material thereby forcing the material while in its fluent state to exude from said outlet into a confined space against a predetermined counter pressure until prevented by the hardening of the material and measuring the quantity of material exuded under such conditions as an index of the hardening properties of the material.

14. A method of determining the hardening properties of rheologic materials of the type which harden under temperature change and pressure, first becoming fluent and then hardening, comprising confining a body of the material in a chamber having an extrusion outlet, simultaneously applying a predetermined temperature and a constant uniform dynamic pressure to the confined material thereby forcing the material while in its fluent state to exude from said outlet against a predetermined counter pressure until prevented by the hardening of the material and measuring the quantity of material exuded under such conditions as an index of the hardening properties of the material.

15. A method of determining the hardening properties of rheologic materials of the type which harden under temperature change and pressure, first becoming fluent and then hardening, comprising confining a body of the material in a chamber having an extrusion outlet, simultaneously applying a predetermined temperature and pressure to the confined material thereby forcing the material while in its fluent state to exude from said outlet into a confined space against a constant uniform counter pressure until prevented by the hardening of the material and measuring the quantity of material exuded under such conditions as an index of the hardening properties of the material.

16. A method of determining the hardening properties of rheologic materials of the type which harden under temperature change and pressure, first becoming fluent and then hardening, comprising confining a body of the material in a chamber having an extrusion outlet, simultaneously applying a predetermined temperature and pressure to the confined material while holding the extrusion outlet closed for any desired time less than that at which the material is no longer fluent, then opening the extrusion outlet and forcing the material while in its fluent state under said applied temperature and pressure to exude from said outlet against a predetermined counter pressure until exudation ceases due to the hardening of the material and measuring the quantity of material exuded under such conditions as an index of the hardening properties of the material.

17. A method of determining the hardening properties of rheologic materials of the type which harden under temperature change and pressure, first becoming fluent and then hardening, comprising confining a body of the material in a chamber having an extrusion outlet, simultaneously applying a predetermined temperature and pressure to the confined material while holding the extrusion outlet closed for any desired time less than that at which the material is no longer fluent, then opening the extrusion outlet and forcing the material while in its fluent state under said applied temperature and pressure to exude from said outlet against a predetermined counter pressure until exudation ceases due to the hardening of the material and measuring in relation to time the quantity of material exuded under such conditions as an index of the hardening properties of the material.

18. A method of determining the hardening properties of rheologic materials of the type which harden under temperature change and pressure, first becoming fluent and then hardening, comprising confining a body of the material in a chamber having an extrusion outlet, simultaneously applying a predetermined temperature and pressure to the confined material thereby forcing the material while in its fluent state to exude from said outlet against a predetermined counter pressure until prevented by the hardening of the material and measuring in relation to time the quantity of material exuded under such conditions as an index of the hardening properties of the material.

LOUIS M. ROSSI.
GILBERT L. PEAKES.